US008544644B2

(12) United States Patent
Meehan

(10) Patent No.: US 8,544,644 B2
(45) Date of Patent: Oct. 1, 2013

(54) CRADLE FOR HAND HELD ELECTRONIC DEVICE

(76) Inventor: John A. Meehan, Belleville, IL (US)

( * ) Notice: Subject to any disclaimer, the term of this patent is extended or adjusted under 35 U.S.C. 154(b) by 0 days.

(21) Appl. No.: 13/412,189

(22) Filed: Mar. 5, 2012

(65) Prior Publication Data

US 2012/0247991 A1 Oct. 4, 2012

Related U.S. Application Data

(60) Provisional application No. 61/562,207, filed on Nov. 21, 2011, provisional application No. 61/465,946, filed on Mar. 28, 2011.

(51) Int. Cl.
*B65D 85/30* (2006.01)

(52) U.S. Cl.
USPC ............................................ 206/320; 206/586

(58) Field of Classification Search
USPC ................... 206/320, 521, 586; 361/679.56;
455/575.8; D14/440
See application file for complete search history.

(56) References Cited

U.S. PATENT DOCUMENTS

| | | | |
|---|---|---|---|
| 5,360,108 A * | 11/1994 | Alagia ........................... | 206/320 |
| 6,616,111 B1 * | 9/2003 | White ........................ | 248/309.1 |
| D543,357 S | 5/2007 | Corcoran | |
| 7,359,184 B2 * | 4/2008 | Lord ......................... | 361/679.55 |
| 7,380,657 B2 * | 6/2008 | Yeh et al. ....................... | 206/320 |
| D616,361 S | 5/2010 | Huang | |
| D634,313 S | 3/2011 | Fitzpatrick et al. | |
| 7,938,260 B2 * | 5/2011 | Lin ................ | 206/320 |
| D643,433 S * | 8/2011 | Hsieh et al. .................. | D14/440 |
| 8,132,670 B1 | 3/2012 | Chen | |
| D668,660 S | 10/2012 | Norfolk | |
| D668,661 S * | 10/2012 | Norfolk ....................... | D14/440 |
| D674,803 S * | 1/2013 | Westrup ....................... | D14/440 |
| 2004/0025993 A1 * | 2/2004 | Russell .......................... | 150/154 |
| 2004/0112776 A1 * | 6/2004 | Lord ............................. | 206/320 |
| 2011/0034220 A1 * | 2/2011 | Lee ............................ | 455/575.8 |
| 2012/0043247 A1 * | 2/2012 | Westrup ....................... | 206/472 |
| 2012/0193496 A1 * | 8/2012 | Li ............................... | 248/316.1 |
| 2012/0261289 A1 * | 10/2012 | Wyner et al. .................. | 206/320 |

* cited by examiner

*Primary Examiner* — Steven A. Reynolds
(74) *Attorney, Agent, or Firm* — Polster Lieder Woodruff & Lucchessi, L.C.

(57) ABSTRACT

A cradle device adapted to receive personal electronic devices or hand held electronic devices. The cradle is formed of a silica gel compound and configured and sized to receive a hand held personal electronic device. In one aspect the cradle has a four sided frame which stretches and slips over and clips on electronic device allowing for the encasement of the electronic device on all four sides. Openings are strategically positioned in the frame to allow for access to functional buttons and ports on the electronic device. The cradle includes gripping structures extending between the frame for grasping or holding the cradle and electronic device.

6 Claims, 4 Drawing Sheets

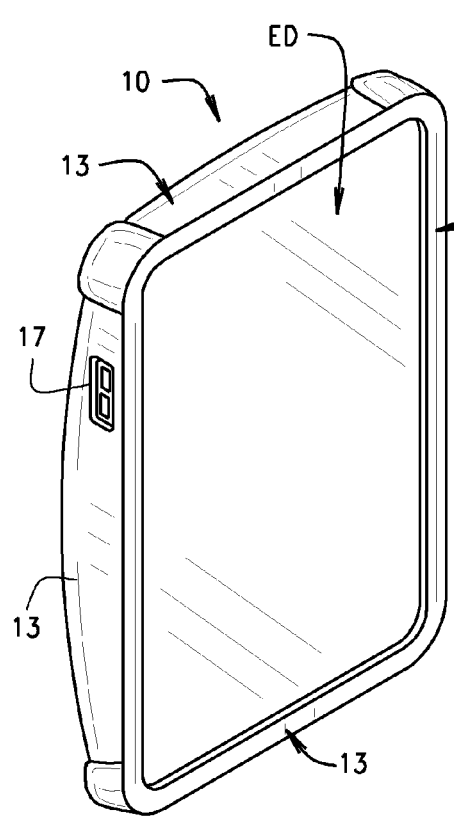
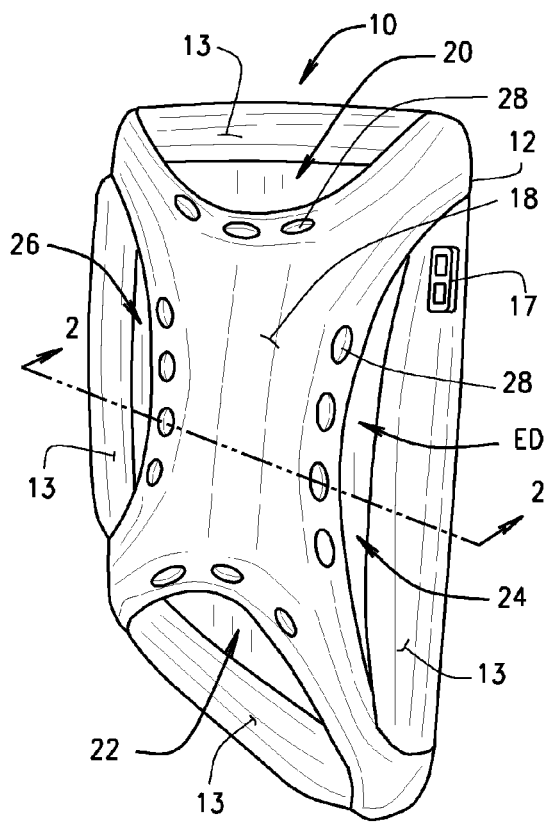
F I G . 1 A
F I G . 1 B
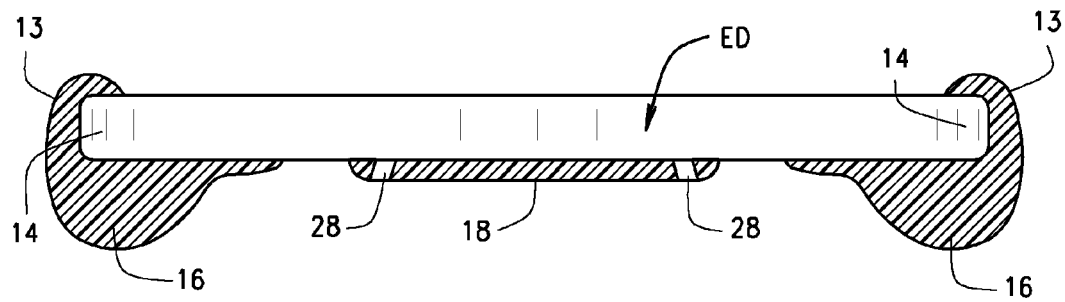
F I G . 2

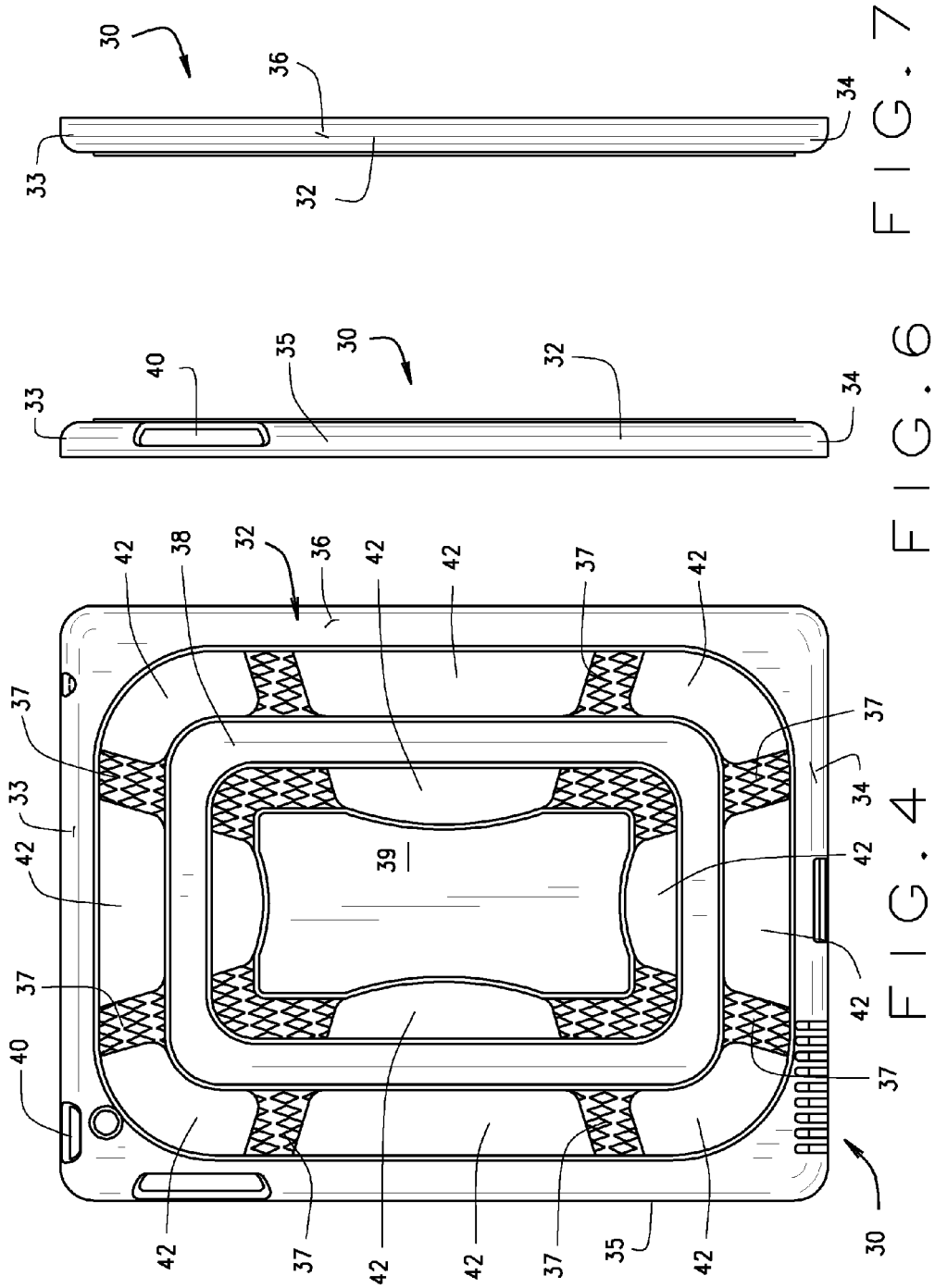

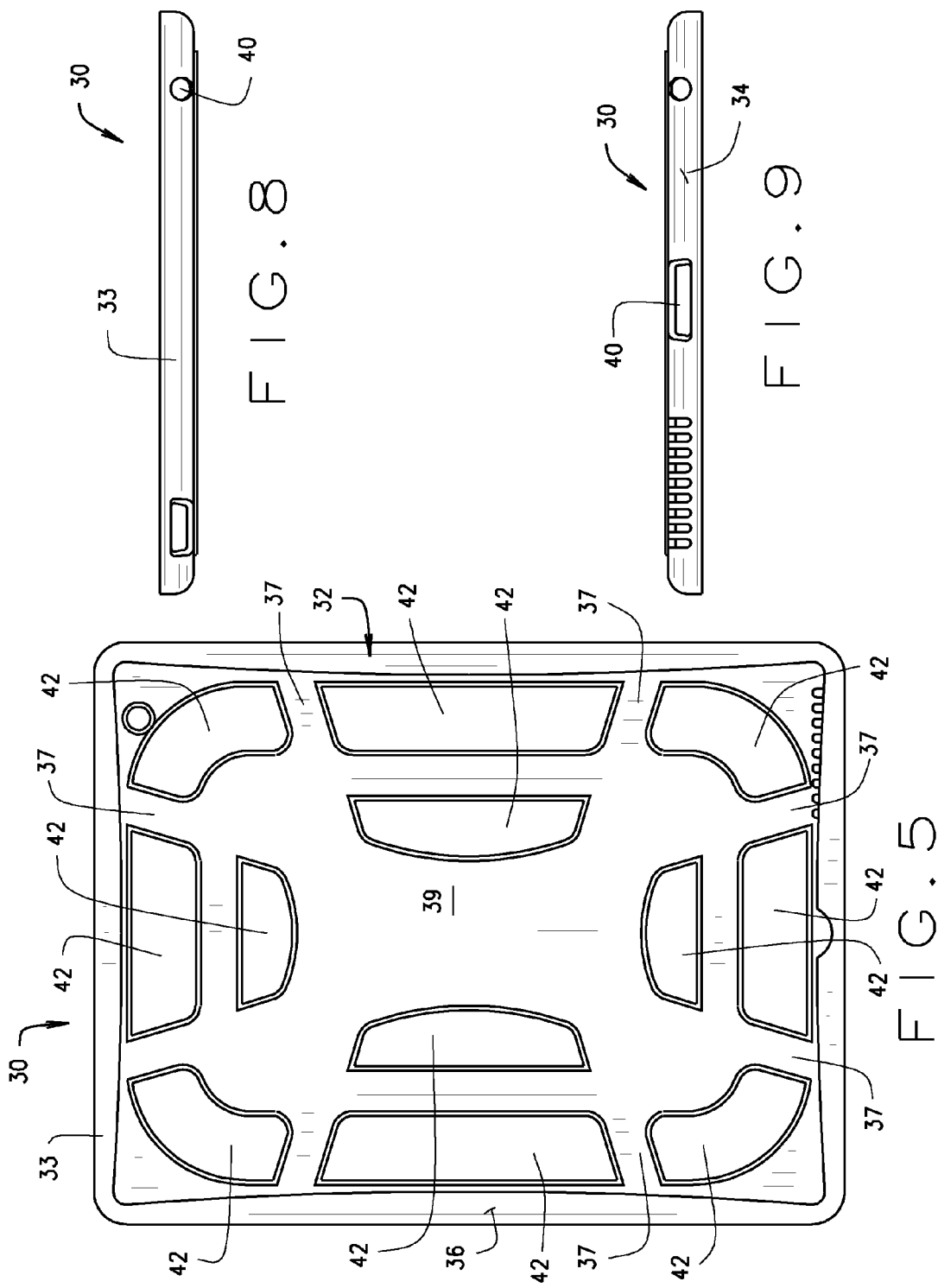

CRADLE FOR HAND HELD ELECTRONIC DEVICE

CROSS REFERENCE TO RELATED APPLICATIONS

This application claims priority to co-pending provisional application Ser. No. 61/562,207, filed Nov. 21, 2011 and to provisional application Ser. No. 61/465,946, filed Mar. 28, 2011, both of which are incorporated herein by reference.

BACKGROUND OF THE INVENTION

The invention relates generally to a cradle or device for securing a personal electronic device, for example a tablet style computer or e-reader or smart phone, that allows the user to more easily and conveniently grip the device.

Tablet style computers and electronic book readers and smart phones are known to the art and are growing in use. Such devices are convenient for performing myriad functions such as browsing the World Wide Web (www), sending and receiving email, performing research and reading documents and books. For the most part, these devices can be referred to generally as personal electronic devices or hand held electronic devices. Tablet style computers and book readers generally are larger than cellular telephones and provide larger screens and touch points and application icons (apps) and hence are easier to use and view than a cellular telephone or smart phone. However, if the user has limited dexterity in his or her hands due to injury, age or disease, these devices can be cumbersome to hold and use. Also, a user may want to handle or manipulate the device in special circumstances, for example on exercise equipment or the like.

In any event, it would be advantageous to have an apparatus for securing the personal electronic device that facilitates gripping of the device by a user and also offers some protection to the device.

SUMMARY OF THE INVENTION

A cradle or gripping device adapted to receive personal electronic devices or hand held electronic devices. The cradle is formed of a silica gel compound and configured and sized to receive a hand held personal electronic device. In one aspect the cradle is comprised of four sided frame which stretches and slips over and clips on electronic device allowing for the encasement of the electronic device on all four sides. Openings are strategically cut to allow for access to functional buttons and ports on electronic device. The cradle includes gripping structures extending between the frame for grasping or holding the cradle and electronic device.

BRIEF DESCRIPTION OF THE DRAWINGS

FIG. 1A is a front perspective view of one embodiment of the cradle for hand held electronic device mounted on an electronic device;

FIG. 1 B. is a rear perspective view thereof;

FIG. 2 is a cross sectional view taken along line 2-2 of FIG. 1B;

FIG. 4 is a rear plan view thereof;

FIG. 5 is a front plan view thereof;

FIG. 6 is a right side elevational view;

FIG. 7 is a left side elevational view;

FIG. 8 is a top plan view; and

FIG. 9 is a bottom plan view thereof.

DETAILED DESCRIPTION

Figure 3:
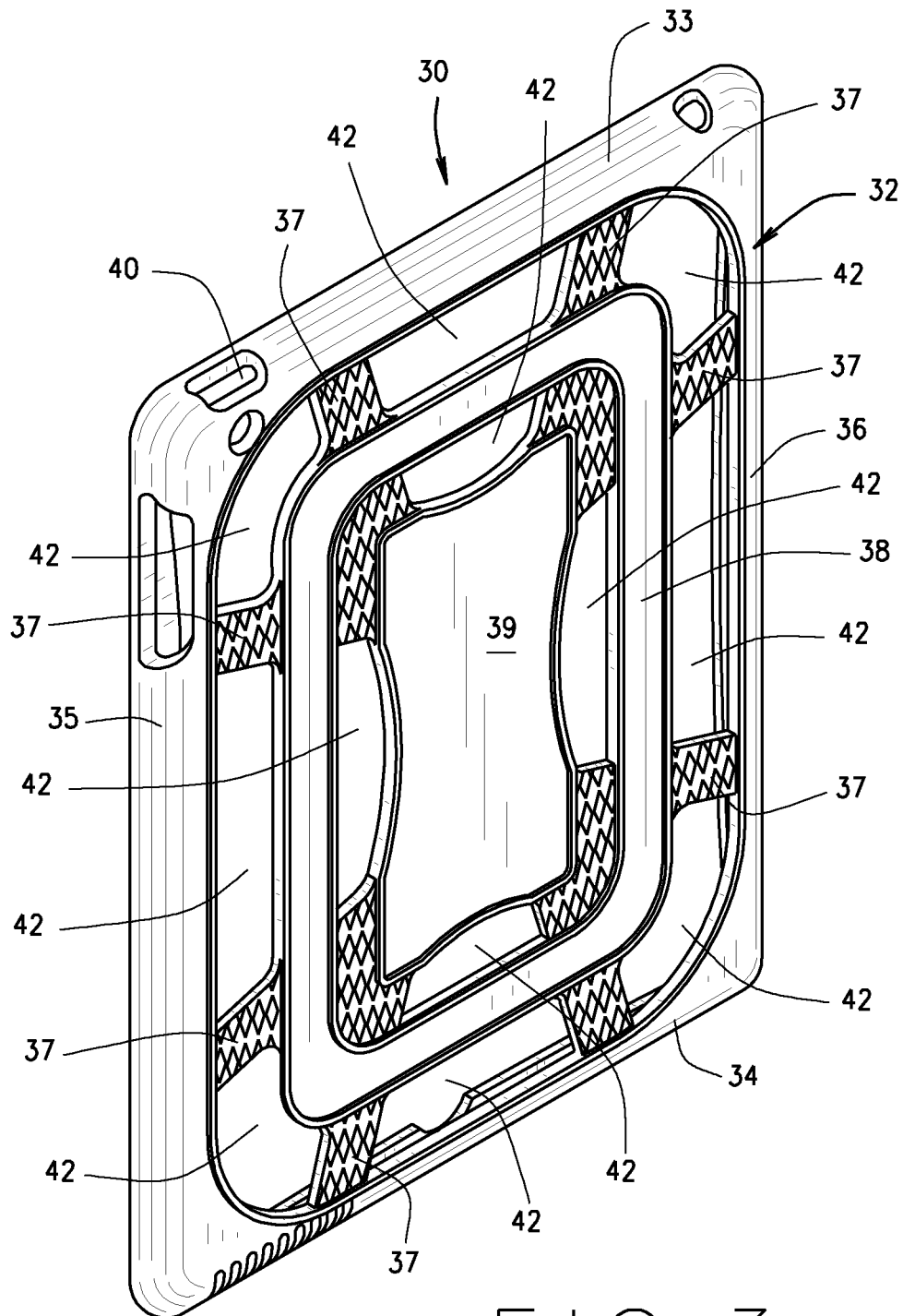
FIG. 3 is a rear perspective view of another embodiment of the cradle.

In one embodiment, shown in FIGS. 1A through 2, a cradle for a hand held electronic device is indicated generally by reference number 10. One such electronic device is indicated in the drawings by ED. It will be appreciate that cradle 10 may be referred to as a cradle, a holder, a cover, a gripper, a gripping device or any other appropriate name. The term "cradle" is used herein for convenience and simplicity and is intended to encompass any such apparatus that falls within the scope of the invention. The term cradle should not be construed as limiting the invention in any manner.

In any event, cradle 10 is intended to facilitate the handling, carrying or gripping of personal electronic device. Cradle 10 comprises a substantially rectangular frame 12 comprised of contiguous or interconnected frame members 13. Frame 12 is dimensioned and configured to conform to the periphery of an electronic device. Hence, the size and configuration may vary without departing from the scope of the invention.

As seen in FIG. 2, frame 12 has a molded cross-sectional shape and defines a channel 14 for securing onto the periphery of an electronic device ED. The molded cross-section defines a bulbous hand grip 16 that allows gripping by an individual, particularly one having impaired hand function, such as a user with arthritis. Frame 12 has a plurality of openings, as at 17, which allow access to ports, buttons and other operating elements of the electronic device secured in the cradle. There are gripping structures, in this embodiment comprising a substantially X-shaped back web 18 within frame 12 extending between frame members 13. Web 18 and frame 12 define four openings 20, 22, 24 and 26 dimensioned to allow the user to insert fingers to grip the web and hence the encased electronic device EP.

In one aspect, at least frame 12 is molded or otherwise constructed from a resilient compound, such as a gel or resilient foam or the like. This allows the frame to stretch over the periphery of an electronic device. The suspension members and web can be molded from similar material or can be constructed from other acceptable materials such as rubber, fabric, plastic or any other material that functions properly in the environment. The ergonomic, slightly protruding configuration provided by molding from a silica gel compound or other appropriate material, which is one preferred material for making the device, allows for the relief of pressure between the hand and wrist point of contact to the device. Each of the openings 20, 22, 24 and 26 feature holes 28 to allow for individual finger placement for alternate gripping pressure if desired. In one aspect, holes 28 are generally one half inch in length. Having holes 28 adjacent each gripping area allows the electronic device to be rotated ninety degrees and still ensure adequate grip pressure. Moreover, the cradle provides cushioning in the event the electronic device is dropped or jarred.

Another embodiment of a cradle is indicated by reference number 30 in FIGS. 3 through 9. Cradle 30 includes a peripheral frame 32 comprising a top member 33, a bottom member 34, a first side member 35 and a second side member 36. The recited frame members are contiguous or interconnected. A concentric frame 38 which is concentric to peripheral frame 32 and connected to the peripheral frame by suspension strips 37. There is a substantially solid central web 39 positioned within and concentric to concentric frame 38 and secured by suspension strips 37 as well.

Peripheral frame 32 is formed to securely seat the periphery or peripheral edge of an electronic device, as previously described. Frame 32 defines a plurality of openings 40 that allow access to ports, buttons and so forth of the electronic device.

As shown, the peripheral and concentric frame structures define a plurality of openings, for example the twelve opening as shown and indicated by reference number 42 that allow for gripping of the cradle and hence the electronic device. The user can grasp the cradle in a multitude of ways, inserting the fingers in any of the openings 42 and interlacing the fingers with the suspension strips 37, concentric middle frame 38 or grasping central web 39 like a handle or grip.

As previously discussed, at least the cradle can be fashioned or appropriately molded from acceptable resilient material such as gel or foam. The concentric frame and concentric web can be gel, foam, rubber, fabric or any other acceptable material.

The cradles described above are representative embodiments of the invention. Features of each of the cradles may be interchanged or additional or modified features may be employed to carry out the broad function of the device. Also, the cradles may be dimensioned to hold different types of electronic devices such as tablet computers, ebook readers, smart phones and so forth.

It will be appreciated that the design of gripping device 30 is not merely functional, but also has a pleasing aesthetic appeal and is designed not only to enhance gripping or handling of the electronic device, but also enhance the ornamental appearance of the electronic device.

It will be appreciated that the gripping devices described preferably are constructed from a moldable resilient material, such as silica gel that also imparts some shock-absorbing characteristics to the device.

The invention claimed is:

1. A cradle adapted to receive a personal electronic device, comprising:
   a four sided elastic peripheral frame for attachment to a peripheral edge of an electronic device allowing for the encasement of the electronic device on all four sides, said frame defining at least one opening for access to functional buttons and ports on an electronic device; and gripping structures comprising a co-planar, concentric frame within the peripheral frame and an elongated co-planar concentric web within the concentric frame for grasping or holding the cradle and electronic device, wherein the concentric frame is spaced apart from and connected to the four sided frame by suspension members.

2. The cradle of claim 1 further wherein the central web is suspended within the concentric frame and attached to the concentric frame by suspension members.

3. The cradle of claim 1 wherein the cradle comprises a silica gel.

4. A cradle adapted to hold a personal electronic device, comprising;
   a rectangular, elastic peripheral frame for attachment to a peripheral edge of an electronic device, the peripheral frame comprising a top frame member, a bottom frame member, a first side member and a second side member; said frame members defining four corners;
   an inner rectangular frame having four corners concentric to and spaced apart from said peripheral frame, said inner frame suspended within the peripheral frame coplanar with the peripheral frame by a pair of spaced apart suspension members positioned adjacent each corner of the inner frame, said concentric frame and said peripheral frame defining a plurality of openings there between; and
   a substantially rectangular central web concentric to and co-planar with the inner frame, said central web suspended within the inner frame by suspension members, said central web and said inner frame defining a plurality of openings there between.

5. The cradle of claim 4 wherein said peripheral frame defines at least one opening for access to functional buttons and ports on an electronic device.

6. The cradle of claim 4 wherein at least said peripheral frame comprises a resilient gel.

* * * * *